US012435844B2

(12) United States Patent
Van Bommel et al.

(10) Patent No.: US 12,435,844 B2
(45) Date of Patent: Oct. 7, 2025

(54) LED FILAMENT WITH HEAT SINK

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/697,816

(22) PCT Filed: Oct. 3, 2022

(86) PCT No.: PCT/EP2022/077454
§ 371 (c)(1),
(2) Date: Apr. 2, 2024

(87) PCT Pub. No.: WO2023/057380
PCT Pub. Date: Apr. 13, 2023

(65) Prior Publication Data

US 2024/0410536 A1 Dec. 12, 2024

(30) Foreign Application Priority Data

Oct. 5, 2021 (EP) .................................... 21200925

(51) Int. Cl.
*F21K 9/237* (2016.01)
*F21V 5/00* (2018.01)
(Continued)

(52) U.S. Cl.
CPC .............. *F21K 9/237* (2016.08); *F21V 5/002* (2013.01); *F21V 11/14* (2013.01); *F21V 29/70* (2015.01);
(Continued)

(58) Field of Classification Search
CPC ......... F21K 9/237; F21V 29/70; F21Y 113/17
See application file for complete search history.

(56) References Cited

U.S. PATENT DOCUMENTS 8,591,062 B2 * 11/2013 Hussell .................. F21K 9/232 362/249.02
9,941,258 B2 * 4/2018 Kong ..................... F21K 9/232
(Continued)

FOREIGN PATENT DOCUMENTS

CN 103855144 A 6/2014
CN 203656626 U 6/2014
(Continued)

*Primary Examiner* — William J Carter

(57) ABSTRACT

A light emitting diode, LED, filament (110), configured to emit LED filament light, comprising an array of a plurality of light emitting diodes (120), LEDs, configured to emit LED light, a carrier (130) arranged to support the plurality of LEDs, at least one heat sink (140) arranged in thermal connection with the carrier for a dissipation of heat from the plurality of LEDs during operation, wherein the at least one heat sink comprises a base portion (150) extending parallel to the carrier, and a plurality of fins (160) projecting from the base portion, and an encapsulant (170) comprising a translucent material, wherein the encapsulant at least partially encloses the plurality of LEDs, the carrier and the at least one heat sink.

15 Claims, 4 Drawing Sheets

(51) Int. Cl.

| | |
|---|---|
| ***F21V 11/14*** | (2006.01) |
| ***F21V 29/70*** | (2015.01) |
| ***F21Y 113/17*** | (2016.01) |
| *F21Y 103/10* | (2016.01) |
| *F21Y 113/00* | (2016.01) |
| *F21Y 115/10* | (2016.01) |

(52) U.S. Cl.
CPC ....... *F21Y 2103/10* (2016.08); *F21Y 2113/17* (2016.08); *F21Y 2113/30* (2023.05); *F21Y 2115/10* (2016.08)

(56) References Cited

U.S. PATENT DOCUMENTS

| | | | | |
|---|---|---|---|---|
| 9,995,474 | B2 * | 6/2018 | Jiang ........................ | F21V 29/70 |
| 2016/0178133 | A1 | 6/2016 | Kong et al. | |
| 2016/0363267 | A1 * | 12/2016 | Jiang ........................ | F21V 29/70 |

FOREIGN PATENT DOCUMENTS

| | | | | |
|---|---|---|---|---|
| CN | 104006321 | A | | 8/2014 |
| CN | 203932114 | U | | 11/2014 |
| CN | 204460087 | U | | 7/2015 |
| CN | 207999659 | U | * | 10/2018 |
| CN | 208846103 | U | * | 5/2019 |
| CN | 217082227 | U | * | 7/2022 |
| DE | 102015120085 | A1 | | 5/2017 |
| EP | 3154097 | A1 | | 4/2017 |
| WO | 2020088966 | A1 | | 5/2020 |

* cited by examiner

LED FILAMENT WITH HEAT SINK

CROSS-REFERENCE TO PRIOR APPLICATIONS

This application is the U.S. National Phase application under 35 U.S.C. § 371 of International Application No. PCT/EP2022/077454, filed on Oct. 3, 2022, which claims the benefit of European Patent Application No. 21200925.2, filed on Oct. 5, 2021. These applications are hereby incorporated by reference herein.

FIELD OF THE INVENTION

The present invention generally relates to lighting arrangements comprising one or more light emitting diodes, LEDs. More specifically, the present invention is related to a LED filament with a heat sink.

BACKGROUND OF THE INVENTION

The use of light emitting diodes (LED) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy. In particular, LED filament lamps are highly appreciated as they are very decorative.

Due to the advantageous aspects of the use of LEDs, the interest has rapidly increased to replace conventional light sources with LEDs in many lighting arrangements. It will be appreciated that this replacement, also called retrofitting, is appreciated and desired by users who wish to have the look of an incandescent bulb. The light source replacement (retrofitting) is often performed by removing the conventional light source(s) from the luminaire (e.g. a lamp holder) of the lighting arrangement and attaching the LEDs, LED arrangement(s) or LED device(s) into the luminaire. One of these concepts is based on LED filaments which are placed in a bulb, as the appearance of lamps of this kind are appreciated as they are highly decorative.

A recent development is the use of LED filaments in high performance lighting applications such as high brightness and/or high luminous flux lamps and luminaires. In addition to provide a maximum output of the light and/or a specific colour of the light from the LED filament lamps, the design or construction of a lighting device needs to take into account the evacuation of heat generated by the LED filaments. It should be noted that the effect of heat may be detrimental to the LED filaments, and their operation may hereby become erratic and unstable. Hence, thermal management is an important issue to prevent thermal damage of the LED filaments, and it is necessary to dissipate excess heat in order to maintain the reliability of the lighting device and to prevent premature failure of the LED filaments.

However, the current thermal management of LED arrangements may often be inefficient, and may be insufficient in case of high performance lighting applications such as high brightness and/or high luminous flux lamps and luminaires.

US 2016/178133 discloses an LED lead frame assembly includes a circuit strip assembly, a plastic dam member overmoulded onto the circuit strip assembly and a LED chip assembly disposed in a pocket of the plastic dam member. The LED chip assembly is electrically coupled to the circuit strip assembly to power the LED chip assembly.

CN 203656626U discloses a LED lamp without a metal radiator, comprising at least one LED lamp tube, at least one LED illumination strip is installed in each bulb shell, each illumination strip is provided with metal cooling fins and comprises a metal substrate, at least one metal cooling fin which is integrated with the metal substrate, a light reflecting layer arranged on the metal substrate, at least one string of LED chips arranged on the light reflecting layer, and a transparent medium layer or a luminescent powder layer, the LED chips are coated with the transparent medium layer or the luminescent powder layer, In EP3154097 a LED lamp filament is disclosed comprising: a long strip-shaped substrate, a plurality of light-emitting units arranged on a first surface of the substrate and distributed along the extending direction of the substrate, and a light-transmittable fluorescent glue layer covering the first surface and the plurality of light-emitting units. A plurality of bulges are provided on at least one side of the substrate, and the bulges are distributed along the extending direction of the substrate; one part of light excited by the fluorescent glue layer and emitted from the light-emitting units emits out in a direction towards a second surface, opposite to the first surface, of the substrate from a space between adjacent bulges.

Hence, it is an object of the present invention to try to overcome at least some of the deficiencies of present LED arrangements regarding their insufficient and/or inefficient heat dissipation properties, and to provide a LED arrangement with an improved thermal management whilst being able to provide a desired optical performance.

SUMMARY OF THE INVENTION

It is of interest to overcome at least some of the deficiencies of the current thermal management of LED arrangements, e.g. comprising LED filaments, for an improved operation of these LED arrangements whilst providing a desired optical performance.

This and other objects are achieved by providing a LED filament having the features in the independent claim. Preferred embodiments are defined in the dependent claims.

Hence, according to the present invention, there is provided a light emitting diode, LED, filament, configured to emit LED filament light. The LED filament comprises an array of a plurality of light emitting diodes, LEDs, configured to emit LED light. The LED filament further comprises a carrier arranged to support the plurality of LEDs. Furthermore, the LED filament comprises at least one heat sink arranged in thermal connection with the carrier for a dissipation of heat from the plurality of LEDs during operation, wherein the at least one heat sink comprises a base portion extending parallel to the carrier, and a plurality of fins projecting from the base portion. The LED filament further comprises an encapsulant comprising a translucent material, wherein the encapsulant at least partially encloses the plurality of LEDs, the carrier and the at least one heat sink.

Thus, the present invention is based on the idea of providing a LED filament wherein heat may be conveniently and efficiently dissipated from the LED filament during operation, whilst providing a desired light output by minimizing any obstruction and/or undesired impact of the light emitted from the LED filament. Hence, the present invention may provide the combination of a desired light output in terms of light distribution and/or aesthetically appealing lighting from the LED filament during operation via the encapsulant, while at the same time optimizing the thermal management of the LED filament via the heat sink(s).

The present invention is advantageous in that the thermal connection between the carrier of the LED filament and the heat sink(s), e.g. by direct physical contact, ensures an efficient transfer of heat from the LED filament to the heat sink by conduction. More specifically, the LED filament may efficiently dissipate heat generated by the plurality of LEDs during operation via the base portion and/or the fins of the heat sink(s). Consequently, the present invention provides an efficient thermal management of the LED arrangement, thereby minimizing the detrimental effects of heat on the LEDs of the LED filament during operation.

The present invention is further advantageous in that the encapsulant of the LED filament is able to provide a desired light output, comprising a desired (omnidirectional) distribution of the light as well as an aesthetically decorative or appealing lighting effect.

It will be appreciated that the LED filament of the present invention furthermore comprises relatively few components. The relatively low number of components is advantageous in that the LED filament is relatively inexpensive to fabricate. Moreover, the relatively low number of components of the LED filament implies an easier recycling, especially compared to devices or arrangements comprising a relatively high number of components which impede an easy disassembling and/or recycling operation.

The LED filament, which is configured or arranged to emit LED filament light, comprises an array of LEDs, which are configured or arranged to emit LED light. It will be appreciated that the LED filament light may comprise the LED light and/or the LED light as affected (e.g. scattered and/or converted) by the encapsulant of the LED filament. By the term "array", it is here meant a linear arrangement or chain of LEDs, or the like, arranged on the LED filament. The LED filament further comprises a carrier arranged to support the plurality of LEDs. Hence, the plurality of LEDs may be arranged, mounted and/or mechanically coupled on/to a carrier (e.g. a substrate), wherein the carrier is configured to mechanically and/or electrically support the LEDs. Furthermore, the carrier may be light transmissive and/or reflective. The LED filament further comprises at least one heat sink arranged in thermal connection with the carrier for a dissipation of heat from the plurality of LEDs during operation. By the term "heat sink", it is here meant substantially any structure, component, arrangement, or the like, which is configured and/or arranged to dissipate heat. The at least one heat sink comprises a base portion extending parallel to the carrier. As the carrier may be elongated in order to support the array of LEDs of the (elongated) LED filament, the base portion(s) of the heat sink(s) may be elongated. The at least one heat sink further comprises a plurality of fins projecting from the base portion. By the term "fins", it is here meant relatively thin portions of the at least one heat sink, wherein the fins project or extend individually from the base portion for the purpose of heat dissipation. The LED filament further comprises an encapsulant comprising a translucent material, wherein the encapsulant at least partially encloses the plurality of LEDs, the carrier and the at least one heat sink. By the term "encapsulant", it is here meant a material, element, arrangement, or the like, which is configured or arranged to at least partially surround, encapsulate and/or enclose the plurality of LEDs, the carrier and the at least one heat sink of the LED filament. By the term "translucent material", it is here meant a material, composition and/or substance which is translucent and/or transparent for visible light.

According to an embodiment of the present invention, the at least one heat sink may comprise a metal foil. By the term "metal foil", it is here meant a relatively thin sheet of metal. For example, the base portion of the at least one heat sink may comprise or constitute a metal foil. The present embodiment is advantageous in that the (thin) metal foil may be preserve the relatively light, flexible, pliant and/or supple properties of the LED filament. In other words, compared to relatively bulky and/or heavy heat sink structures in the prior art, the relatively thin metal foil of the present embodiment may provide a desired heat management of the LED filament whilst providing a relatively light, flexible, pliant and/or supple LED filament. The present embodiment is further advantageous in that the metal foil may be conveniently arranged in close vicinity, or in physical contact with, the carrier of the LED filament, resulting in a particularly effective transfer of heat from the plurality of LEDs, via the carrier, to the metal foil of the heat sink(s). The present embodiment is further advantageous in that the material properties of the metal, providing a high heat conductivity, is particularly advantageous for a transfer of heat from the LEDs during operation.

According to an embodiment of the present invention, the plurality of fins of the at least one heat sink may constitute folds of the base portion of the at least one heat sink. Hence, the base portion(s) of the heat sink(s) of the LED filament has been folded such that the folds constitute and/or form the plurality of fins. The present embodiment is advantageous in that the plurality of fins may be produced and/or provided conveniently from the material of the base portion of the heat sink. It will be appreciated that the present embodiment is particularly advantageous in case the base portion of the heat sink is a metal foil, as the metal foil may be folded easily and conveniently into folds. Yet another advantageous aspect of the embodiment of the present invention is that in case the plurality of fins is arranged perpendicular to the carrier of the LED filament, this configuration allows for a desired flexibility of the LED filament in order to arrange the LED filament in a spiral, coil and/or helix configuration.

According to an embodiment of the present invention, the plurality of LEDs may be arranged on a first side of the carrier, and one heat sink of the at least one heat sink may be arranged on a second side of the carrier, opposite the first side of the carrier. Hence, the array of the plurality of LEDs and the heat sink may be arranged on opposite sides of the (two-sided) carrier. The present embodiment is advantageous in that the heat sink may even further minimize any obstruction and/or undesired impact of the light emitted from the LED filament, and consequently, that the LED filament light and/or the LED light may be provided in an even more desirable way with respect to illumination and/or aesthetic purposes.

According to an embodiment of the present invention, the plurality of LEDs and one heat sink of the at least one heat sink may be are arranged on a first side of the carrier. Hence, the array of the plurality of LEDs and the heat sink may be arranged on the same (first) side of the (two-sided) carrier. The present embodiment is advantageous in that the heat transfer to the heat sink from the LEDs and/or carrier may be even more efficient due to arrangement of the LEDs and the heat sink in relatively close vicinity of each other.

According to an embodiment of the present invention, the base portion of the at least one heat sink may comprise a plurality of apertures configured to transmit at least part of the LED filament light through the plurality of apertures. By the term "apertures", it is here meant openings, (through) holes, or the like, of the base portion(s). The present embodiment is advantageous in that the apertures of the heat sink(s) may even further minimize any obstruction of the light emitted from the LED filament. It should be noted that one of the main purposes of the apertures is to transmit the light from one side of the carrier to the other side of the carrier. The transmitted light is basically scattered LED light, as the LEDs are configured to emit light away from the heat sink(s) which is scattered and/or reflected back by the encapsulant, e.g. by a luminescent material and/or scattering particles of the encapsulant.

According to an embodiment of the present invention, the at least one heat sink may comprise at least one of copper, Cu, and aluminum, Al. Hence, the heat sink(s) may comprise Cu and/or Al. The present embodiment is advantageous in that Cu, Al, and/or an alloy thereof have high heat conductivity properties, thereby constituting excellent heat sink material(s).

According to an embodiment of the present invention, the at least one heat sink may further comprise a layer comprising at least one of an electrically insulating material, whereby the layer constitutes an electrical insulation layer, and a reflective material, whereby the layer constitutes a reflective layer having a higher reflectivity than the base portion of the at least one heat sink. Hence, the heat sink(s) may comprise an electrical insulation layer comprising one or more electrically insulating materials and/or a reflective layer comprising a reflective material. By "reflective layer", it is here meant a coating or layer which is configured to reflect incident light. For example, a coating or layer of high reflectivity such as aluminum (Al) and/or silver (Ag) may be evaporated on the heat sink. The present embodiment is advantageous in that the reflective layer of the heat sink may efficiently reflect the light emitted from the LED filament upon operation. According to an embodiment of the present invention, the encapsulant may completely enclose the at least one heat sink. Hence, the heat sink(s) may be completely enclosed by the encapsulant. According to an embodiment of the present invention, the plurality of fins of the at least one heat sink may protrude the encapsulant and may extend from the encapsulant.

According to an embodiment of the present invention, the encapsulant may comprise at least one of a light-scattering material configured to scatter light emitted from the plurality of LEDs and a luminescent material configured to at least partly convert light emitted from the plurality of LEDs into converted light. Hence, the encapsulant may comprise a light scattering material configured to scatter the LED light emitted from the plurality of LEDs and/or a luminescent material configured to at least partly convert the LED light emitted from the plurality of LEDs into converted light.

According to an embodiment of the present invention, the encapsulant and the at least one heat sink may be flexible. The encapsulant and/or the heat sink(s) may be flexible in that they may flex back to its (their) original shape, i.e. reversibly flexible. Alternatively, the encapsulant and/or the heat sink(s) may be flexible in that they may be changed to a new shape and maintained in the new shape, i.e. irreversibly flexible.

According to an embodiment of the present invention, the encapsulant may comprise silicone. The present embodiment is advantageous in that silicone is light transmissive and highly resistant against heat and light, thereby mitigating degradation of the encapsulant.

According to an embodiment of the present invention, the base portion of the at least one heat sink may comprise a plurality of apertures configured to transmit at least part of the LED filament light through the plurality of apertures, wherein the encapsulant may comprise at least one of a light-scattering material configured to scatter light emitted from the plurality of LEDs and a luminescent material configured to at least partly convert light emitted from the plurality of LEDs into converted light, wherein the encapsulant may be flexible and the at least one heat sink may be flexible, and wherein the LED filament may have at least one of a spiral, meander, coil and helix shape. The present embodiment is advantageous in that the features of the LED filament are particularly beneficial for providing the combination of a desired light output in terms of light distribution and/or aesthetically appealing lighting from the LED filament during operation via the encapsulant and the spiral, meander, coil and/or helix shape of the LED filament, while at the same time optimizing the thermal management of the LED filament via the heat sink(s).

According to an embodiment of the present invention, there is provided a LED lighting device. The LED lighting device may comprise a LED filament according to any one of the preceding embodiments. The LED lighting device may further comprise a cover comprising an at least partially transparent material, wherein the cover at least partially encloses the LED filament, and an electrical connection connected to the LED filament for a supply of power to the plurality of LEDs of the LED filament. By the term "cover", it is here meant an enclosing element, such as a cap, cover, envelope, or the like, comprising an at least partial translucent and/or transparent material. The present embodiment is advantageous in that the LED filament according to the invention may be conveniently arranged in substantially any lighting LED lighting device, such as a LED filament lamp, luminaire, lighting system, or the like. The LED lighting device may further comprise a driver for supplying power the LEDs of the LED filament. Additionally, the lighting device may further comprise a controller for individual control of two or more subsets of LEDs of the LED filament, such as a first set of LEDs, a second set of LEDs, etc.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
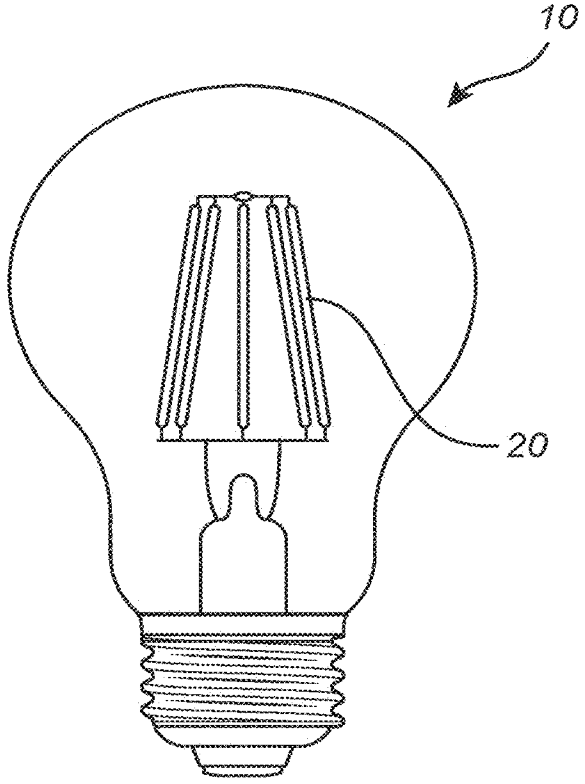
Fig. 1 PRIOR ART
FIG. 1 schematically shows a LED filament lamp according to the prior art, comprising LED filaments, FIG. 2*a* schematically shows a LED filament according to an exemplifying embodiment of the present invention, FIG. 2*b* schematically shows a heat sink of a LED filament according to an exemplifying embodiment of the present invention, FIGS. 2*c* and 2*d* schematically show a LED filament according other exemplifying embodiments of the present invention, FIGS. 3*a*-3*c* schematically show a provision of a heat sink of a LED filament according to an exemplifying embodiment of the present invention, and FIG. 4 schematically shows a LED light device according to an exemplifying embodiment of the present invention.

FIG. 1 shows a LED filament lamp 10 according to the prior art, comprising a plurality of LED filaments 20. LED filament lamps 10 of this kind are highly appreciated as they are very decorative, as well as providing numerous advantages compared to incandescent lamps such as a longer operational life, a reduced power consumption, and an increased efficiency related to the ratio between light energy and heat energy.

FIG. 2 schematically shows a LED filament 110 according to an exemplifying embodiment of the present invention. The LED filament 110, which elongates along the axis, A, is configured to emit LED filament light. The LED filament 110 may preferably have a length, $L_f$, in the range from 1 cm to 20 cm, more preferably 2 cm to 12 cm, and most preferred 3 cm to 10 cm. The LED filament 110 may preferably have a width, $W_f$, in the range from 0.5 mm to 10 mm, more preferably 0.8 mm to 8 mm, and most preferred 1 to 5 mm. The aspect ratio $L_f/W_f$ is preferably at least 5, more preferably at least 8, and most preferred at least 10.

The LED filament 100 comprises an array or "chain" of a plurality of LEDs 120 configured to emit LED light. For example, the array or "chain" of the plurality of LEDs 120 may comprise a plurality of adjacently arranged LEDs 120 wherein a respective wiring is provided between each pair of LEDs 120. The plurality of LEDs 120 preferably comprises more than 5 LEDs, more preferably more than 8 LEDs, and even more preferred more than 10 LEDs. The plurality of LEDs 120 may be direct emitting LEDs which provide a color. The LEDs 120 are preferably blue LEDs. The LEDs 120 may also be UV LEDs. A combination of LEDs 120, e.g. UV LEDs and blue light LEDs, may be used. The LEDs 120 may comprise laser diodes. The LED filament light emitted from the LED filament 110 during operation is preferably white light. The white light is preferably within 15 SDCM from the black body locus (BBL). The color temperature of the white light is preferably in the range of 2000 to 6000 K, more preferably in the range from 2100 to 5000 K, most preferably in the range from 2200 to 4000 K such as for example 2300 K or 2700 K. The white light has preferably a CRI of at least 75, more preferably at least 80, most preferably at least 85 such as for example 90 or 92.

The LED filament 110 further comprises a carrier 130 arranged to support the plurality of LEDs 120. The plurality of LEDs 120 may be arranged, mounted and/or mechanically coupled on/to the carrier 130. The carrier 130, e.g. a substrate, is configured to mechanically and/or electrically support the plurality of LEDs 120. The carrier 130 may be a printed circuit board (PCB). The carrier 130 may be light transmissive and/or reflective. Furthermore, the carrier 130 may be flexible, and may for example comprise a polymer foil (e.g. polyimide (PI), polyethylene terephthalate (PET), etc.). The carrier 130 may comprise one or more thermally conductive layers and one or more insulating layers.

Figure 2A:
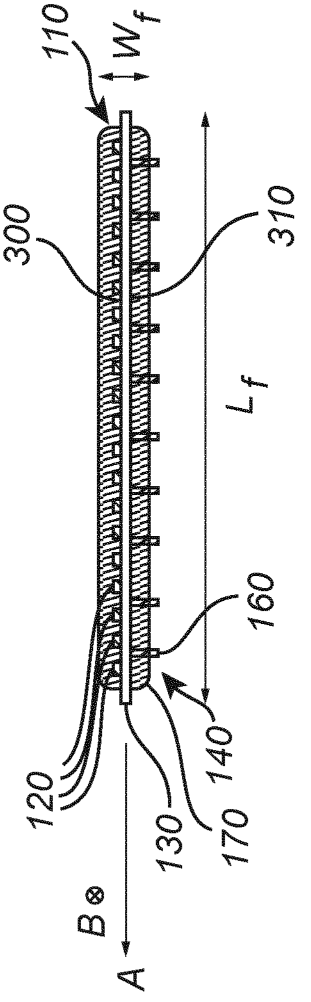

The LED filament 110 further comprises at least one heat sink 140, wherein a single heat sink 140 is exemplified in FIG. 2*a*. The heat sink 140 is arranged adjacent the carrier 130 and is arranged in thermal connection with the carrier 130 for a dissipation of heat from the plurality of LEDs 120 during operation of the LED filament 100. The heat sink 140 may be arranged in physical (direct) contact with the carrier 130. It should be noted that the heat sink 140 may constitute and/or have the form of substantially any structure, component, arrangement, or the like, which is configured and/or arranged to dissipate heat. The heat sink 140 comprises a base portion (not indicated/shown in FIG. 2*a* for reasons of visibility) extending parallel to the carrier 130. It should be noted that the carrier in FIG. 2*a* is elongated in order to support the array of LEDs 120 of the (elongated) LED filament 100, and the base portion of the heat sink 140 is hereby also elongated. The heat sink 140 further comprises a plurality of fins 160 projecting from its base portion. Albeit FIG. 2*a* shows a single heat sink 140, the LED filament 110 may alternatively comprise two heat sinks on either side of the carrier 130. For example, the two heat sinks may be the same (or similar), or alternatively, be different, with respect to one or more properties.

Figure 2B:
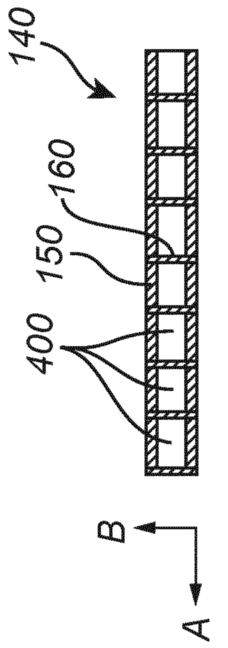

FIG. 2*b* schematically shows a heat sink 140 of a LED filament 110 according to an exemplifying embodiment of the present invention and corresponds to the heat sink 140 shown in FIG. 2*a*. The base portion 150 of the heat sink 140 comprises a plurality of apertures 400 configured to transmit at least part of the LED filament light through the plurality of apertures 400. It should be noted that as an alternative to apertures 400, indentations and/or recesses may be provided. According to the example in FIG. 2*b*, the apertures 400 of the base portion 150 are rectangular and are spaced apart with regular intervals, such that the base portion 150 has the shape of a ladder. For example, the contact area of the heat sink 140 on the carrier, due to the provision of the apertures 400, may be in a range from 20% to 80% of the surface area of the carrier/heat sink 140.

The "steps" of the ladder-shaped base portion 150 correspond to the plurality of fins 160 of the heat sink 140 in FIG. 2*a*. The material of the heat sink 140 is preferably a metal or alloy with a relatively high thermal conductivity, such as copper (Cu) and/or aluminum (Al). The heat sink 140 may have a thermal conductivity of at least 200 $Wm^{-1}K^{-1}$, preferably >250 $Wm^{-1}K^{-1}$, more preferably >300 $Wm^{-1}K^{-1}$, and most preferably >350 $Wm^{-1}K^{-1}$.

Preferably, and according to an embodiment of the invention, the heat sink 140 comprises a metal foil, such as a copper foil. The thickness of the metal foil may be constant. The thickness of the metal foil may be in a range from 20 to 2000 μm, preferably 50 to 1000 μm, even more preferred 80 to 800 μm, and most preferred 100 to 500 μm. The thermal conductivity of the heat sink 140 is preferably at least 200 W/mK, more preferably more than 250 W/mK, and most preferred more than 300 W/mK. The heat sink 140 may be flexible. The heat sink 140 may further comprise a layer (not shown) comprising an electrically insulating material, whereby the layer constitutes an electrical insulation layer, and/or a reflective material, whereby the layer constitutes a reflective layer having a higher reflectivity than the base portion 150 of the heat sink 140. The reflective layer may reflect the incident light from the LED filament 110 during operation. The reflective layer may, for example, comprise a reflective coating. The reflective layer or coating may comprise any material of high reflectivity such as aluminum (Al) and/or silver (Ag) which may be evaporated on the heat sink 140. The reflective layer may be conveniently applied by chemical vapor deposition (CVD) or physical vapor deposition (PVD).

In FIG. 2*a*, the LED filament 110 further comprises an encapsulant 170. The encapsulant 170 comprises a translucent material. Furthermore, the encapsulant 170 may comprise a light-scattering material configured to scatter light emitted from the plurality of LEDs 120 and/or a luminescent material configured to at least partly convert light emitted from the plurality of LEDs 120 into converted light. The light-scattering material may preferably have a reflectivity of >70%, more preferably >80%, and most preferably >85%.

The LED filament light may hereby comprise the LED light and/or the converted light. The luminescent material is configured to emit light under external energy excitation. For example, the luminescent material may comprise a fluorescent material. The luminescent material may comprise an inorganic phosphor, an organic phosphor and/or quantum dots/rods. The UV/blue LED light may be partially or fully absorbed by the luminescent material and converted to light of another color e.g. green, yellow, orange and/or red. The encapsulant 170 may be flexible. Furthermore, the encapsulant 170 may comprise silicone.

In FIG. 2*a*, the encapsulant 170 at least partially encloses the plurality of LEDs 120, the carrier 130 and the heat sink 140. For example, and as indicated in FIG. 2*a*, the encapsulant 170 fully encloses the plurality of LEDs 120. The encapsulant 170 partially encloses the carrier 130, as the length and/or width of the carrier 130 may be longer and/or wider than the length and/or width of the LED filament 110. Furthermore, the encapsulant 170 partially encloses the heat sink 140, as the plurality of fins 160 of the heat sink 140 protrudes the encapsulant 170 and extends from the encapsulant 170. The cross-section of the encapsulant 170 perpendicular to the axis, A, may be circular, but it will be noted that the encapsulant 170 may have substantially any other shape of its cross-section.

According to the example of the LED filament 110 of FIG. 2*a*, the plurality of LEDs 120 is arranged on a first (front) side 300 of the carrier 130, and one (single) heat sink 140 is arranged on a second (back) side 310 of the carrier 130, wherein the second side 310 of the carrier 130 is arranged opposite the first side 300 of the carrier 130. According to a non-showed example of the LED filament 110, the plurality of LEDs 120 and one (single) heat sink 140 may be arranged on the first side 300 of the carrier 130.

By the LED filament 110 in FIG. 2*a*, heat may be conveniently and efficiently dissipated from the LED filament 110 during operation, whilst minimizing any obstruction of the light emitted from the LED filament 110. Hence, the LED filament 110 may provide the combination of a desired light distribution from the LED filament 110 during operation, while at the same time optimizing the thermal management of the LED filament 110 via the heat sink 150.

Figure 2C:
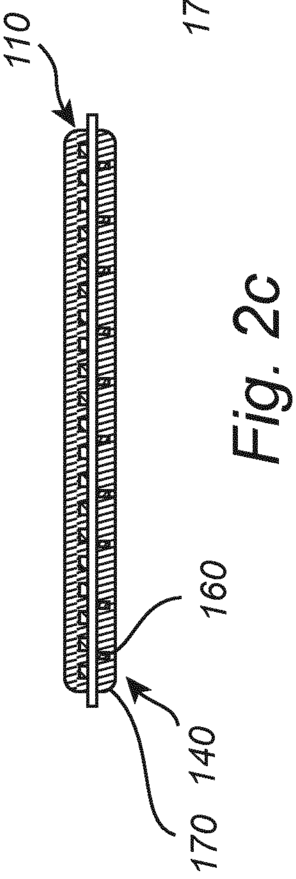

FIG. 2*c* shows an alternative embodiment of the LED filament 110 shown in FIG. 2*a*. As many features of the LED filament 110 in FIG. 2*c* are similar or the same as of the LED filament 110 in FIG. 2*a*, some references have been omitted and it is further referred to FIG. 2*a* and the associated caption for an increased understanding of the LED filament 110. In FIG. 2*c*, the encapsulant 170 fully encloses the plurality of LEDs. The encapsulant 170 partially encloses the carrier, as the length and/or width of the carrier may be longer and/or wider than the length and/or width of the LED filament 110. Furthermore, the encapsulant 170 completely encloses the heat sink 140, including the plurality of fins 160 of the heat sink 140.

Figure 2D:
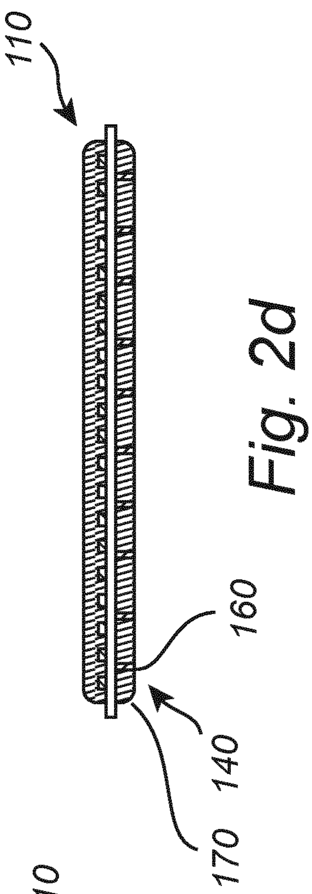

FIG. 2*d* shows yet another alternative embodiment of the LED filament 110 shown in FIG. 2*a* and FIG. 2*c*. As many features of the LED filament 110 in FIG. 2*d* are similar or the same as of the LED filament 110 in FIG. 2*a*, some references have been omitted and it is further referred to FIG. 2*a* and the associated caption for an increased understanding of the LED filament 110. In FIG. 2*d*, the encapsulant 170 fully encloses the plurality of LEDs. The encapsulant 170 partially encloses the carrier, as the length and/or width of the carrier may be longer and/or wider than the length and/or width of the LED filament 110. Furthermore, the length of the plurality of fins 160 of the heat sink 140 correspond to the radius of the encapsulant 170, such that the edges of the plurality of fins 160 of the heat sink 140 are arranged flush with the edge of the encapsulant 170.

It should be noted that FIGS. 2*a*-*d* show exemplifying embodiments of LED filament(s) 110, and that the shape and/or number of LED filament(s) may differ from that/those shown. For example, the LED filament(s) 100 may have a spiral, meander, coil and/or helix shape.

Figure 3A:
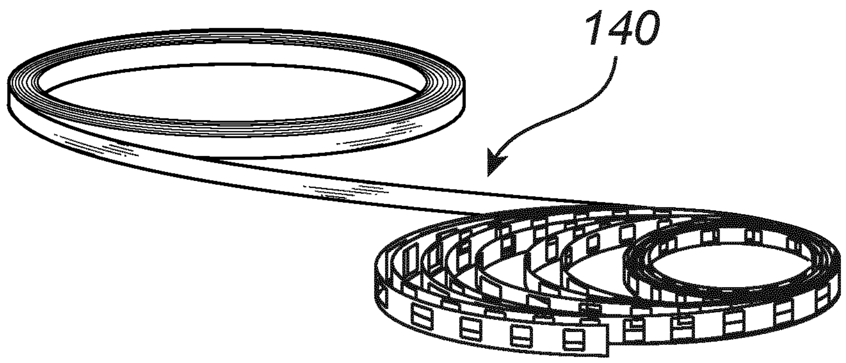
Figure 3B:
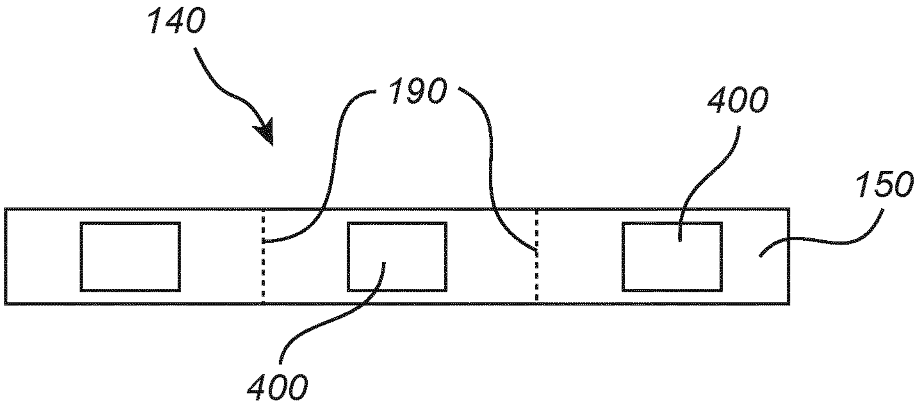
Figure 3C:
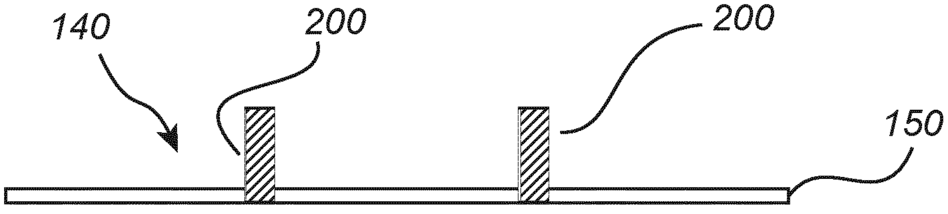

FIG. 3*a*-3*c* schematically show a provision of a heat sink 140 of a LED filament according to an exemplifying embodiment of the present invention. In FIG. 3*a*, the material and form of the heat sink 140 is provided from a metal foil, preferably a copper foil, which comprises (or alternatively, is provided with in a subsequent manufacturing step) equidistantly arranged apertures. As schematically shown in FIG. 3*b*, the heat sink 140 in form of the metal (copper) foil exemplified in FIG. 3*a* comprises perforated lines 190 provided equidistantly from the apertures 400. From a folding operation of the heat sink 140 at the perforated lines 190, a plurality of folds 200, e.g. N folds 200, wherein N is an integer, of the base portion 150 may be constructed for the heat sink 140, as indicated schematically in FIG. 3*c*. The folds 200 may hereby constitute the plurality of fins 160 of the base portion 150 of the heat sink 140 of the LED filament 110 as indicated in FIG. 2*a*. Preferably, $N \geq 5$, i.e. at least 5 folds 200, more preferred $N \geq 10$, i.e. at least 10 folds 200, and most preferred $N \geq 15$, i.e. at least 15 folds 200. At least one LED may be arranged between adjacent (neighboring) folds 200. The height of the folds 200 may be in a range from 1 to 10 mm, more preferably in a range from 2 to 8 mm, and most preferred in a range from 3 to 5 mm. The distance between neighboring folds 200 may be in a range from 0.5 to 10 mm, preferably 1 to 8 mm, even more preferred 2 to 6 mm, and most preferably 3 to 5 mm. The pitch (distance) between neighboring folds may be constant.

Figure 4:
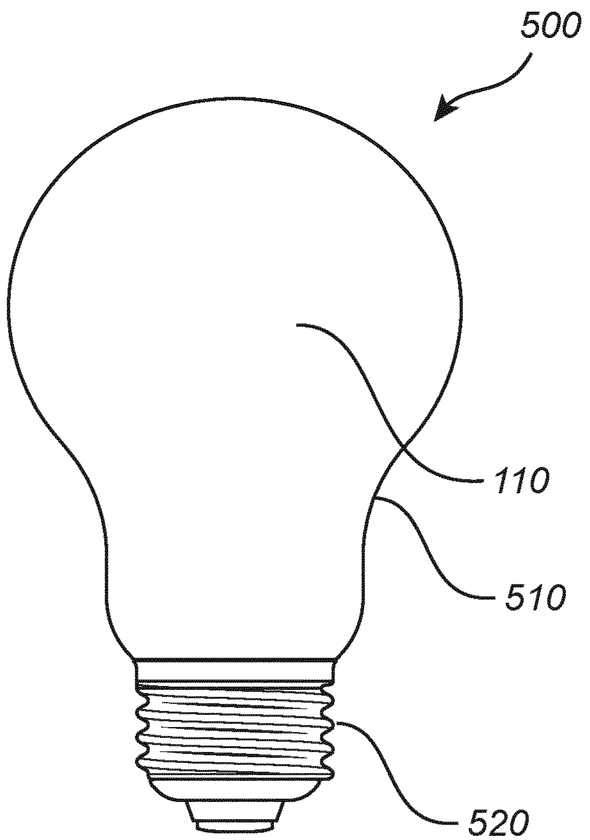

FIG. 4 schematically shows a LED lighting device 500 according to an embodiment of the present invention. The LED lighting device 500, which may constitute a lamp or a luminaire, comprises one or more LED filaments 110 according to any one of the previously described embodiments. The LED lighting device 500 further comprises a cover 510, which is exemplified as being bulb-shaped. The cover 510 may comprise an at least partially light transmissive (e.g. transparent) material and at least partially encloses the LED filament 110. The LED lighting device 500 further comprises an electrical connection 520 connected to the LED filament 110 for a supply of power to the plurality of LEDs of the LED filament 110.

The person skilled in the art realizes that the present invention by no means is limited to the preferred embodiments described above. On the contrary, many modifications and variations are possible within the scope of the appended claims. For example, one or more of the LED filament(s) 110, the heat sink 140, the encapsulant 170, etc., may have different shapes, dimensions and/or sizes than those depicted/described.

The invention claimed is:

1. A light emitting diode, LED, filament, configured to emit LED filament light, comprising an array of a plurality of light emitting diodes, LEDs, configured to emit LED light, a carrier arranged along a longitudinal axis of the LED filament and configured to support the plurality of LEDs, at least one heat sink arranged in thermal connection with the carrier for a dissipation of heat from the plurality of LEDs during operation, the at least one heat sink having a base portion extending parallel to the carrier along the longitudinal axis of the LED filament, and a plurality of fins projecting perpendicularly from the base portion relative to the longitudinal axis of the LED filament, and an encapsulant comprising a translucent material, the encapsulant at least partially enclosing the plurality of LEDs, the carrier, and the at least one heat sink, wherein the at least one heat sink has a metal foil, and the base portion of the at least one heat sink has a plurality of apertures configured to transmit at least part of the LED filament light through the plurality of apertures.

2. The LED filament according to claim 1, wherein the plurality of fins of the at least one heat sink constitutes folds of the base portion of the at least one heat sink.

3. The LED filament according to claim 1, wherein the plurality of LEDs is arranged on a first side of the carrier, and one heat sink of the at least one heat sink is arranged on a second side of the carrier, opposite the first side of the carrier.

4. The LED filament according to claim 1, wherein the plurality of LEDs and one heat sink of the at least one heat sink are arranged on a first side of the carrier.

5. The LED filament according to claim 1, wherein the at least one heat sink comprises at least one of copper, Cu, and aluminum, Al.

6. The LED filament according to claim 1, wherein the at least one heat sink further comprises a layer comprising at least one of an electrically insulating material, whereby the layer constitutes an electrical insulation layer, and a reflective material, whereby the layer constitutes a reflective layer having a higher reflectivity than the base portion of the at least one heat sink.

7. The LED filament according to claim 1, wherein the encapsulant completely encloses the at least one heat sink.

8. The LED filament according to claim 1, wherein the plurality of fins of the at least one heat sink protrudes through and extends from the encapsulant.

9. The LED filament according to claim 1, wherein the encapsulant comprises at least one of a light-scattering material configured to scatter light emitted from the plurality of LEDs and a luminescent material configured to at least partly convert light emitted from the plurality of LEDs into converted light.

10. The LED filament according to claim 1, wherein the encapsulant and the at least one heat sink are flexible.

11. The LED filament according to claim 1, wherein the encapsulant comprises silicone.

12. The LED filament according to claim 1, wherein the base portion of the at least one heat sink comprises a plurality of apertures configured to transmit at least part of the LED filament light through the plurality of apertures, wherein the encapsulant comprises at least one of a light-scattering material configured to scatter light emitted from the plurality of LEDs and a luminescent material configured to at least partly convert light emitted from the plurality of LEDs into converted light, wherein the encapsulant is flexible and the at least one heat sink is flexible, and wherein the LED filament has at least one of a spiral, meander, coil and helix shape.

13. A LED lighting device, comprising:

at least one LED filament according to claim 1, a cover comprising an at least partially transparent material, wherein the cover at least partially encloses the LED filament, and an electrical connection connected to the LED filament for a supply of power to the plurality of LEDs of the LED filament.

14. The LED filament according to claim 1, wherein the plurality of fins are evenly spaced and extend between proximal and distal ends of the base portion relative to the longitudinal axis of the LED filament.

15. A light emitting diode, LED, filament, configured to emit LED filament light, comprising an array of a plurality of light emitting diodes, LEDs, configured to emit LED light, a carrier arranged along a longitudinal axis of the LED filament and configured to support the plurality of LEDs, at least one heat sink arranged in thermal connection with the carrier for a dissipation of heat from the plurality of LEDs during operation, the at least one heat sink having a base portion extending parallel to the carrier along the longitudinal axis of the LED filament, and a plurality of fins projecting perpendicularly from the base portion relative to the longitudinal axis of the LED filament, and an encapsulant comprising a translucent material, the encapsulant at least partially enclosing the plurality of LEDs, the carrier, and the at least one heat sink, wherein the at least one heat sink has a metal foil, the base portion of the at least one heat sink has a plurality of apertures configured to transmit at least part of the LED filament light through the plurality of apertures, the encapsulant has at least one of a light-scattering material configured to scatter light emitted from the plurality of LEDs and a luminescent material configured to at least partly convert light emitted from the plurality of LEDs into converted light, the encapsulant is flexible and the at least one heat sink is flexible, and the LED filament has at least one of a spiral, meander, coil, and helix shape.

* * * * *